Patented Feb. 12, 1924.

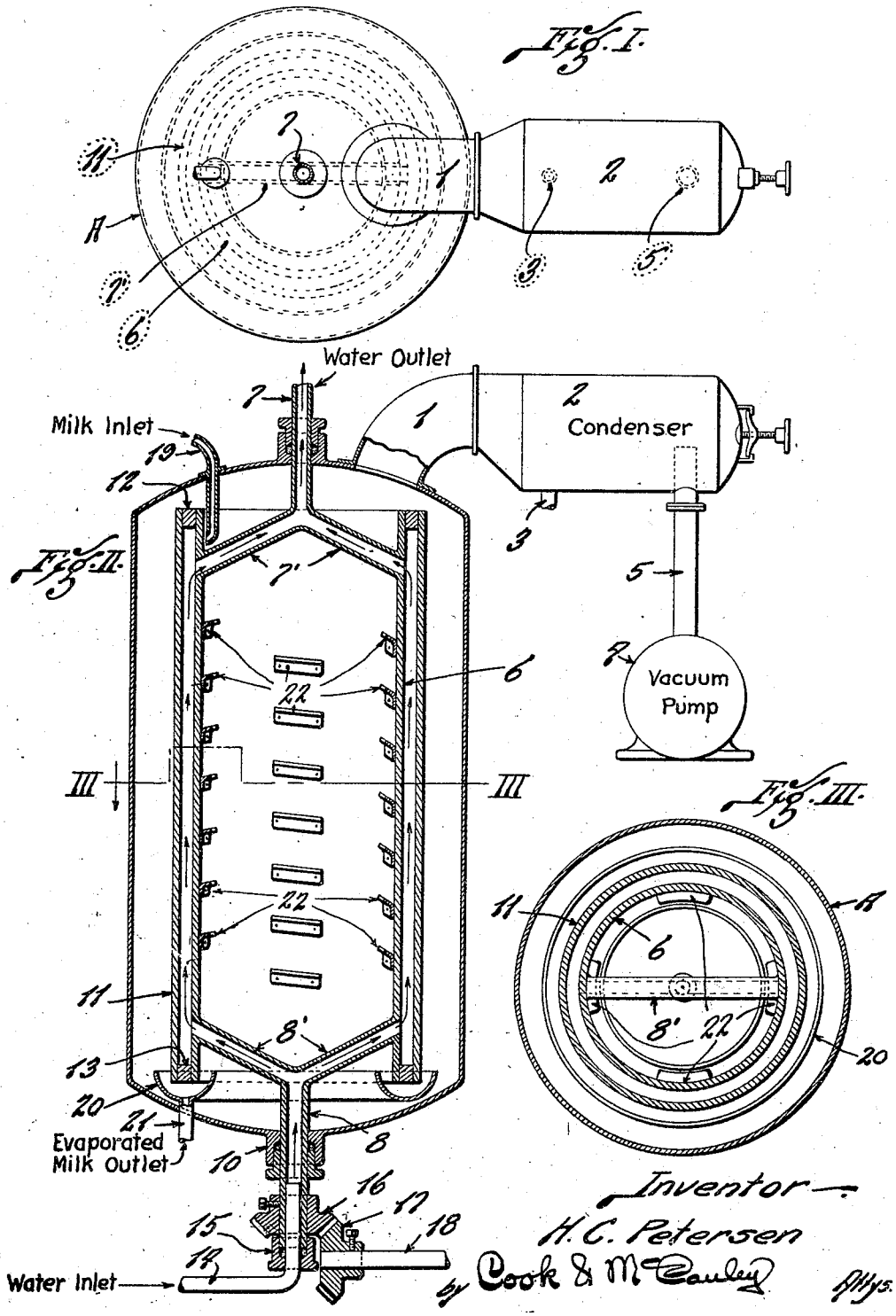

1,483,194

UNITED STATES PATENT OFFICE.

HENRY C. PETERSEN, OF STE. GENEVIEVE, MISSOURI.

EVAPORATING APPARATUS.

Application filed October 4, 1920. Serial No. 414,686.

*To all whom it may concern:*

Be it known that I, HENRY C. PETERSEN, a citizen of the United States of America, and a resident of Ste. Genevieve, in the county of Ste. Genevieve and State of Missouri, have invented certain new and useful Improvements in Evaporating Apparatus, of which the following is a full, clear, and exact description, reference being had to the accompanying drawings forming a part of this specification.

This invention relates to improvements in, methods of and apparatus for evaporating milk and other liquids, one of the objects being to provide a simple method and apparatus whereby the entire mass of liquid to be evaporated can be effectively heated. A further object is to provide a simple and inexpensive apparatus whereby a continuous stream of liquid is spread in the form of a film on the surface of a heating element, where it is exposed to the heat for a brief period of time. A constant stream of liquid is discharged onto the heating element, and the product is constantly discharged from said heating element.

Another object is to carry out a process of this kind in a vacuum and in such a manner that a predetermined relatively low temperature may be constantly maintained, thereby maintaining the necessary heat for vaporization without liability of overheating the liquid.

The specific process about to be described relates to the separation of liquids having different boiling points and more particularly to the evaporation of water from milk, which takes place in a vacuum where the water is vaporized at a temperature of about 170° F., and in carrying out this process the temperature is preferably less than about 172° F., for at higher temperatures the milk will be scorched and the product will have an undesirable cooked or burned flavor. In the apparatus herein shown, the film of milk can be very easily heated to a predetermined temperature so as to effectively vaporize all of its constituents which boil at that temperature, without danger of overheating any portion of the milk.

A constant stream of milk to be evaporated is delivered to a centrifugal device including a revolving heating element wherein a vacuum is maintained, and centrifugal force is utilized to spread the milk in a thin film on the inner surface of a revolving heating element. The film of milk gradually advances along the surface of the heating element where it is very effectively exposed to the heat. The water in the advancing film of milk is rapidly vaporized and thereby separated from the remaining constituents of the milk. The heat is preferably furnished by the transmission of hot water through the revolving centrifugal device, but it is to be understood that the invention is not limited to this particular means for heating the film of liquid.

Fig. I is a top view of an apparatus embodying the features of this invention.

Fig. II is a side elevation, partly in vertical section.

Fig. III is a horizontal section on the line III—III, Fig. II, with some of the lower parts shown in elevation.

To illustrate the invention I have shown a vacuum chamber A provided at its upper end with a vapor conductor 1 leading to a condenser 2, the latter being provided with an outlet pipe 3 for the discharge of condensate. A vacuum pump 4 is connected to the condenser 2 through the medium of a suction pipe 5.

A centrifugal device, located within the vacuum pump, comprises a cylinder 6 provided with hollow trunnions 7 and 8, which extend through stuffing boxes 9 and 10, respectively, on the vacuum chamber. These stuffing boxes serve as bearings for the trunnions and they also prevent leakage of air into the vacuum chamber. 11 designates a jacket surrounding the cylinder 6 and separated therefrom by means of rings 12 and 13 at the top and bottom of the cylinder. The hollow trunnion 8 is provided with branches 8' leading to the space between the jacket 11 and the cylinder 6, and similar branches 7' lead from the upper portion of this space to the trunnion 7. The branches 8' serve as means for conducting a heating fluid from the hollow trunnion 8 to the annular space around the cylinder, and the branches 7' are adapted to conduct the heating fluid from the annular space to the hollow trunnion 7. These branches also serve as means for connecting the cylinder and its jacket to the trunnions.

The heating fluid, preferably hot water, is admitted through an inlet pipe 14, which extends into the lower end of the hollow trunnion 8. A stuffing box 15 may be located at the lower end of trunnion 8 to prevent leakage of the heating fluid.

The means for rotating the cylinder and its jacket comprises a gear wheel 16 secured to the lower trunnion 8 at a point outside of the vacuum chamber A, and a driving gear 17 meshing with the gear wheel 16, said driving gear being fixed to a power shaft 18 which may be operated by any suitable power mechanism.

The milk to be evaporated is admitted through a delivery pipe 19 extending through the vacuum chamber and into the cylinder 6, so as to discharge a stream of milk onto the inner face of the cylinder. The milk inlet is thus located near the upper end of the cylinder, and a stationary receiver 20 in the form of an annular trough is located below the cylinder, the lower margin of said cylinder being located within the annular receiver. 21 designates a discharge pipe whereby the evaporated milk is conducted from the receiver 20 to the exterior of the vacuum chamber. I do not deem it necessary to show the various valves which may be employed to control the flow of the several fluids, for it will be readily understood that such valves can be located at any convenient points in the fluid conductors.

When the apparatus is in operation, a continuous stream of milk is discharged from the delivery pipe 19 and onto the inner face of the cylinder 6. The cylinder is rotated at a speed great enough to provide a centrifugal force whereby the milk is spread in the form of a film on the inner face of the revolving cylinder, and at the same time hot water, or other heating medium, is transmitted through the jacket around the revolving cylinder so as to maintain said cylinder at a predetermined temperature, preferably about 170° F. By spreading the milk in this manner, and at the same time forcing the film of milk into firm contact with the hot inner face of the revolving cylinder, the temperature of all of the constituents of the milk is quickly raised to the predetermined degree, thereby avoiding loss of time in the transmission of heat to the entire mass of milk, and also avoiding heat losses and the danger of overheating, which occur when it is necessary to transmit the heat through a larger body of liquid.

While the cylinder is rotated at a speed great enough to cause the milk therein to spread in the form of a film on the inside face of said cylinder, still the speed of said cylinder is not great enough to cause said milk to be discharged over the upper edge of same.

The interior of the revolving cylinder is in free communication with the vacuum chamber, so the water in the revolving film of milk will pass away in the form of vapor at a temperature lower than 170° F.

The axis of cylinder 6 and its trunnions 7 and 8 is vertical, and the revolving film of milk tending to adhere to the inner face of the cylinder will gradually drop by gravity, the water being vaporized while the film of milk is moving downwardly on the inner face of the cylinder, and the remaining constituents being discharged from the lower end of the cylinder and into the annular receiver 20 which partly encloses said lower end. If the specific method herein disclosed is followed, the product discharged into the receiver 20 will be evaporated milk.

The film of milk tends to adhere to the inner face of the revolving cylinder, so its downward motion in response to the force of gravity will be relatively slow. However, this motion may be accelerated by the use of spirally arranged deflectors 22 extending from the inner face of the cylinder. These deflectors are preferably arranged in rows and separated from each other to permit downward movement of the film of milk between them.

I claim:

1. In an evaporator of the character described, a vacuum chamber having a vapor outlet, means for maintaining a vacuum in said chamber, a centrifugal device including a heating element in the form of a cylinder having an inner face adapted to receive the liquid to be evaporated and a jacket surrounding said cylinder, means for delivering the liquid to said inner face of the cylinder, bearings in which said cylinder is rotatably mounted, said cylinder being provided with hollow trunnions arranged in said bearings, means for rotating said cylinder to forcibly spread the liquid in the form of a film on said inner face of the cylinder, and means for transmitting a heating fluid through said hollow trunnions and through said jacket so as to heat the film of liquid on said inner face of the cylinder, the interior of said cylinder being in free communication with said vacuum chamber to provide for vaporization of the liquid at a relatively low temperature.

2. In an evaporator of the character described, a vacuum chamber having a vapor outlet, means for maintaining a vacuum in said chamber, a rotary cylinder in said vacuum chamber, said cylinder being provided with hollow trunnions extending through walls of said vacuum chamber, the axis of said cylinder and trunnions being vertical, a jacket surrounding said cylinder and communicating with said hollow trunnions, means whereby a heating fluid is delivered into one of said hollow trunnions to provide for the transmission of heat to said jacket and cylinder, means for transmitting rotary motion to one of said trunnions so as to rotate the cylinder in the vacuum chamber, means whereby liquid to be evaporated is discharged onto the inner face of the rotary cylinder at a point near the upper end of said cylinder, and an annular receiver in said vacuum chamber adapted to receive the product passing from the lower end of said cylinder.

3. In an evaporator of the character described, a vacuum chamber having a vapor outlet, means for maintaining a vacuum in said chamber, a rotary cylinder in said vacuum chamber, said cylinder being provided with hollow trunnions extending through walls of said vacuum chamber, the axis of said cylinder and trunnions being vertical, a jacket surrounding said cylinder and communicating with said hollow trunnions, means whereby a heating fluid is delivered into one of said hollow trunnions to provide for the transmission of heat to said jacket and cylinder, means for transmitting rotary motion to one of said trunnions so as to rotate the cylinder in the vacuum chamber, means whereby liquid to be evaporated is discharged onto the inner face of the rotary cylinder, an annular receiver below said rotary cylinder to receive the product discharged from the inner face of the cylinder, the lower margin of said cylinder being located within said annular receiver, and a discharge conductor leading from said annular receiver to the exterior of said vacuum chamber.

4. In an apparatus for evaporating milk, a vacuum chamber having a vapor outlet, means for maintaining a vacuum in said vacuum chamber, a centrifugal device including a heating element in the form of a cylinder having an inner face adapted to receive the milk to be evaporated, means for delivering milk to said inner face of the cylinder, means for rotating said cylinder to forcibly spread the milk in the form of a film on said inner face, said cylinder being arranged in an upright position to permit the film of milk to drop by gravity, means for transmitting heat to the rotating cylinder so as to vaporize water in the film of milk, the interior of said cylinder being in free communication with said vacuum chamber, a receiver in said vacuum chamber adapted to receive the constituents of the milk passing from the lower end of said cylinder, and spirally arranged deflectors extending from said inner face of the cylinder to force the film of milk toward said receiver.

In testimony that I claim the foregoing I hereunto affix my signature.

HENRY C. PETERSEN.